United States Patent [19]

Morita

[11] 4,077,924

[45] Mar. 7, 1978

[54] POLYESTER FIBER-RUBBER COMPOSITES VULCANIZED WITH PHOSPHINOTHIOYL AMINO SULFIDES

[75] Inventor: Eiichi Morita, Copley, Ohio

[73] Assignee: Monsanto Company, St. Louis, Mo.

[21] Appl. No.: 705,671

[22] Filed: Jul. 15, 1976

[51] Int. Cl.² .......................... C08L 9/00; C08L 67/00
[52] U.S. Cl. .................................. 260/3; 260/293.85; 260/873; 544/110
[58] Field of Search ...................... 260/3, 79.5 B, 873, 260/944

[56] References Cited
U.S. PATENT DOCUMENTS 1,867,631  7/1932  Romieux et al. ..................... 260/925
2,891,059  6/1959  Malz et al. ........................... 260/944
3,494,900  2/1970  Morita et al. ................... 260/79.5 B
3,839,498  10/1974  Nudenberg et al. ..................... 260/3

Primary Examiner—Harold D. Anderson
Assistant Examiner—L. Hendriksen

[57] ABSTRACT

Improved polyester fiber-rubber vulcanizates are described which are prepared with phosphinothioyl amino sulfide of the formula

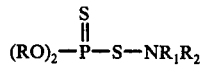

as the vulcanization accelerator.

26 Claims, No Drawings

POLYESTER FIBER-RUBBER COMPOSITES VULCANIZED WITH PHOSPHINOTHIOYL AMINO SULFIDES

This invention concerns polyester fiber rubber compositions containing phosphinothioyl amino sulfide accelerators and processes for vulcanizing polyester fiber rubber compositions using the aforesaid accelerators. More particularly, it concerns polyester fiber vulcanized rubber compositions containing sulfenamides derived from dithiophosphoric acids and amines.

BACKGROUND OF THE INVENTION

It has been reported that polyester cord degrades in a rubber product vulcanized with a vulcanization system containing sulfenamide accelerators. The polyester cord degradation is attributed to the deleterious effects of the amine bearing accelerators. Rev. Gen. Caout. Plast., 48(6), 663–9 (1971), Chem. Abstracts, 75, 119075 s and R. Chem. & Tech., 46, 442–8 (1973). Reduction in the deterioration of polyester cord has been achieved by use of amine-free accelerator systems such as thioperoxydiphosphates or zinc phosphorodithioate. U.S. Pat. Nos. 3,554,857 and 3,627,712. This invention concerns polyester-rubber composites which, although vulcanized with a class of sulfenamide accelerators, exhibit reduced polyester cord degradation.

SUMMARY OF THE INVENTION

It has been discovered that sulfenamide accelerators derived from dithiophosphoric acids and amines can be used to vulcanize polyester fiber-rubber composite without adversely affecting the durability of the polyester fiber. Thus, the invention provides polyester fiber-rubber compositions containing phosphinothioyl amino sulfide accelerators which upon vulcanization and heat aging exhibit improved polyester fiber stability resulting in greater strength retention of the fiber thereby extending the useful life of products made thereof.

Accelerators of the invention are phosphinothioyl amino sulfides of the formula

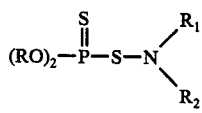

in which R, $R_1$ and $R_2$ independently are alkyl of 1 to 12 carbon atoms, cycloalkyl of 5 to 8 carbon atoms, alkaryl of 7 to 10 carbon atoms, phenyl or mono- or di-lower alkyl substituted phenyl or $R_1$ is hydrogen or $R_1$ and $R_2$ together with the nitrogen atom form a heterocycle in which $R_1$ and $R_2$ are joined forming an alkylene radical or oxygen interrupted alkylene radical of 4 to 8 carbon atoms. Alkyl radicals of 1 to 5 carbon atoms are preferred which radicals hereinafter will be referred to as "lower alkyl" radicals. Accelerators in which R is lower alkyl are preferred. Two important subclasses of such accelerators are accelerators in which $R_1$ is hydrogen and $R_2$ is lower alkyl and accelerators in which $R_1$ is hydrogen or lower alkyl and $R_2$ is phenyl. Accelerators in which R or $R_2$ is secondary or tertiary lower alkyl are especially preferred.

Examples of R, $R_1$ and $R_2$ are methyl, ethyl, propyl, isopropyl, butyl, isobutyl, sec-butyl, tert-butyl, pentyl, hexyl, heptyl, octyl, 2-ethylhexyl, tert-octyl(1,1,3,3-tetramethylbutyl), nonyl, decyl, undecyl, dodecyl, cyclopentyl, cyclohexyl, 2-methylcyclohexyl, 4-methylcyclohexyl, 2,6-dimethylcyclohexyl, cyclooctyl, benzyl, xylyl, isopropylbenzyl, alpha-methylbenzyl, alpha alpha dimethylbenzyl, phenethyl, phenylpropyl, phenyl, tolyl, xylenyl, ethylphenyl, propylphenyl, cumenyl, butylphenyl and t-butylphenyl. Examples of heterocyclic radicals in which $R_1$ and $R_2$ are joined forming an alkylene radical are pyrrolidinyl, 2,5-dimethylpyrrolidinyl, piperidino, 4-methylpiperidino, morpholino, 2,6-dimethylmorpholino, hexahydro-1H-azepin-1-yl, hexahydro-1(2H)azocin-1-yl, octahydro-1H-azonin-1-yl and 3-azabicyclo(3.2.2)non-3-yl.

Examples of suitable accelerators are:
dimethoxyphosphinothioyl methylamino sulfide
dimethoxyphosphinothioyl ethylamino sulfide
dimethoxyphosphinothioyl propylamino sulfide
dimethoxyphosphinothioyl isopropylamino sulfide
dimethoxyphosphinothioyl butylamino sulfide
dimethoxyphosphinothioyl sec-butylamino sulfide
dimethoxyphosphinothioyl tert-butylamino sulfide
dimethoxyphosphinothioyl cyclohexylamino sulfide
dimethoxyphosphinothioyl benzylamino sulfide
dimethoxyphosphinothioyl anilino sulfide
dimethoxyphosphinothioyl dimethylamino sulfide
dimethoxyphosphinothioyl diethylamino sulfide
dimethoxyphosphinothioyl dipropylamino sulfide
dimethoxyphosphinothioyl diisopropylamino sulfide
dimethoxyphosphinothioyl dibutylamino sulfide
dimethoxyphosphinothioyl di-sec-butylamino sulfide
dimethoxyphosphinothioyl N-methyl ethylamino sulfide
dimethoxyphosphinothioyl N-methyl-t-butylamino sulfide
dimethoxyphosphinothioyl dicyclohexylamino sulfide
dimethoxyphosphinothioyl dibenzylamino sulfide
dimethoxyphosphinothioyl N-methylanilino sulfide
dimethoxyphosphinothioyl pyrrolidinyl sulfide
dimethoxyphosphinothioyl 2,5-dimethyl pyrrolidinyl sulfide
dimethoxyphosphinothioyl piperidino sulfide
dimethoxyphosphinothioyl morpholino sulfide
dimethoxyphosphinothioyl hexahydro-1H-azepin-1-yl sulfide
dimethoxyphosphinothioyl hexahydro-1(2H)-azocin-1-yl sulfide
dimethoxyphosphinothioyl octahydro-1-H-azonin-1-yl sulfide
dimethoxyphosphinothioyl 3-azabicyclo(3.2.2)non-3-yl sulfide
and related compounds wherein the dimethoxy radicals are replaced by diethoxy, dipropoxy, diisopropoxy, dibutoxy and the like.

Other examples of suitable accelerators and a method for their preparation are described in Zhurnal Obschei Khimii, Vol. 43, No. 9, pages 1916–1918, Sept. 1973, C. A. Vol. 79, 145918 w. The accelerators may also be prepared by the oxidative condensation with an alkali metal hypohalite or hydrogen peroxide of a dithiophosphoric acid or a thioperoxydiphosphate and an amine; or by reacting a phosphinothioyl sulfenyl chloride and an amine; or by reacting an alkali metal salt of a dithiophosphoric acid and a N-chloroamine.

The accelerators of this invention are utilized, in the same manner as conventional accelerators, by incorporation into the rubber compositions and heating to effect vulcanization. The quantity required varies depending upon the properties desired in the vulcanizate. Amounts of 0.2–10 parts by accelerator per 100 parts rubber are suitable with amounts of 0.5–3.0 parts per 100 parts rubber being the range normally employed. The phosphinothioyl amino sulfides of the invention can be used in any sulfur vulcanizable diene rubber. Natural and synthetic rubbers and mixtures thereof are suitable. Synthetic rubbers include cis-4-polybutadiene, butyl rubber, ethylene-propylene terpolymers (EPDM rubber), polymers of 1,3-butadiene, polymers of isoprene, copolymers of 1,3-butadiene with other monomers, for example, styrene, acrylonitrile, isobutylene, and methylmethacrylate.

The phosphinothioyl amino sulfides are accelerators for the vulcanization of rubber compositions containing sulfur-vulcanizing agents and may be used alone or together with other accelerators, but they are especially potent when used with conventional accelerators. Sulfur-vulcanizing agent means elemental sulfur or sulfur containing vulcanizing agent which at cure temperature or below releases sulfur in the form available to cross-link the rubber. Illustrative vulcanizing agents are amine disulfide and polymeric polysulfide, for example, alkyl phenol disulfides and dimorpholinodisulfide. The rubber compositions may contain the usual compounding ingredients, for example, reinforcing pigments such as carbon black or silica, metal oxide activators such as zinc oxide, stearic acid, antidegradants of the phenolic or amine type, for example, alkylene-bridged cresols, styrenated phenol, sterically-hindered hydroquinones, quinones and N-alkyl-N'-phenyl-p-phenylenediamines.

The phosphinothioyl amino sulfides of the invention may be used in combination with conventional accelerators including thiazole accelerators, dithiocarbamate accelerators, thioperoxydiphosphate accelerators, zinc phosphorodithioate accelerators, thiuram sulfide accelerators, aldehyde-amine accelerators, diaryl guanidine accelerators, and mixtures thereof. Of course, to achieve the minimum degradation of the polyester fiber, it is desirable to eliminate amine-bearing accelerators which are known to be deleterious to polyester fiber stability. However, by using phosphinothioyl amino sulfide accelerators other amine-bearing accelerators may be used in reduced quantity and a corresponding increase in polyester fiber stability can be achieved. For certain applications it is sometimes advantageous to employ curative combinations. Examples of conventional materials which may be used in combination with the aforesaid sulfides of this invention are 2-mercaptobenzothiazole, bis(2-benzothiazolyl) disulfide, N-cyclohexyl-2-benzothiazolesulfenamide, N-tert-butyl-2-benzothiazolesulfenamide, N-diisopropyl-2-benzothiazolesulfenamide, 2-(morpholinothio) benzothiazole, 2-(hexahydro-1H-azepin-1-yl thio)benzothiazole, tetraisopropoxy thioperoxydiphosphate, zinc-0,0'-di-n-butylphosphorodithioate, tetramethylthiuram disulfide, tetraethyl thiuram disulfide, tetramethyl thiuram monosulfide and diphenylguanidine.

Any polyester fiber may be employed in the compositions of this invention. Typically, polyester fiber reinforcing elements are in the form of cords. A common polyester fiber is poly(ethyleneterephthalate) which fiber is widely used as reinforcing textile cords in such products as tires, belts, hose and the like. Other suitable polyester fibers are well known in the art.

For the rubber stocks tested and described herein as illustrative of the invention, Mooney scorch times are determined by means of a Mooney plastometer. The time in minutes ($t_5$) required for the Mooney reading to rise five points above the minimum viscosity is recorded. Longer times on the Mooney scorch test are desirable because this indicates greater processing safety. Cure characteristics are determined at the designated temperatures according to ASTM Procedure D-2084(37). From the rheometer data, the maximum torque, R max., in Newton meters is recorded. The increase in torque is a measure of the degree of vulcanization and is proportional to the crosslink density. The time, $t_2$, in minutes for a rise of two rheometer units above the minimum reading of the rubber sample, and the time, $t_{90}$, required to obtain a torque of 90 percent of the maximum is recorded. The difference, $t_{90} - t_2$, is a measure of the cure rate of the sample. Vulcanizates are prepared by press curing at the selected temperature for the time indicated by the rheometer data to obtain optimum cure. The physical properties of the vulcanizates are measured by conventional methods. Polyester cord stability is determined by accelerated aging tests by subjecting a polyester fiber-cured rubber composite to elevated temperatures for designated times. The "Press Cure Test" procedure is as follows: Greige polyester tire cord is wrapped a number of times around an aluminum bar. Wraps are made so that the cord does not touch adjacent wraps and to maintain about even parallel spaces between each wrap. The ends of the polyester cord are fastened to opposite ends of the aluminum bar so that the cord is under slight tension. The cord-wrapped aluminum bar is covered with vulcanizable rubber stock and cured in a mold under pressure for 2 hours at 175° C. The end of the cured sample is cut, the aluminum bar is removed and the cords are removed from the cured rubber. The cord break strength is determined on at least 10 sections of the cord using an Instron tester with a pulling rate of 12 inches per minute. The cord break strength of a specimen of the unaged polyester cord is determined in a similar manner. Percent cord strength retention is calculated by dividing the average break strength of the cured cord by the average break strength of the uncured cord and multiplying by 100.

The "Sealed Tube Test" procedure is as follows: a greige polyester cord-rubber composite is prepared with the ends of the cords extending out of the rubber. The composite is cured in a mold at 153° C for the time required to achieve optimum cure. The cured composite specimen is placed in an open glass tube and conditioned for 24 hours at 50% relative humidity. The specimen is then sealed within the tube and the sealed tube is heated at 150° C for the indicated periods of time. After cooling the specimen, cords are removed by swelling the rubber in benzene. The cord break strength is determined and the percent cord strength retention is calculated as described above.

DESCRIPTION OF PREFERRED EMBODIMENTS

The process and polyester fiber-rubber compositions of this invention are demonstrated with the following rubber masterbatches. All parts are by weight. Santocure NS, an accelerator, is N-tert-butyl-2-benzothiazolesulfenamide and Thiofide, an accelerator, is bis(2-benzothiazolyl)disulfide.

| RUBBER MASTERBATCHES | | | |
|---|---|---|---|
| Masterbatch | A | B | C |
| Natural rubber | 100.0 | 50.0 | 50.0 |

-continued

RUBBER MASTERBATCHES

| Masterbatch | A | B | C |
|---|---|---|---|
| SBR 1712 | — | 68.8 | — |
| SBR 1778 | — | — | 48.0 |
| Polybutadiene rubber | — | — | 15.0 |
| Carbon black (FEF) | — | 50.0 | — |
| Carbon black (GPF) | — | — | 45.0 |
| Carbon black (ISAF) | 45.0 | — | — |
| Silica | — | — | 5.0 |
| Zinc oxide | 3.0 | 3.0 | 5.0 |
| Stearic acid | 2.0 | 2.0 | 1.0 |
| Hydrocarbon softener | 5.0 | — | 5.0 |
| Wax | — | — | 2.0 |
| Antidegradant | — | — | 2.0 |
| Resorcinol adhesive | — | — | 1.5 |
| Total | 155.0 | 173.8 | 179.5 |

Vulcanizable compositions are prepared by mixing sulfur and accelerator with portions of a rubber masterbatch. Polyester fiber-rubber compositions are prepared with polyester 1000/2 tire cord and the properties of the compositions and tire cord stability are determined as described above. The data are shown in Tables 1–3.

Polyester fiber-natural rubber composites of the invention are illustrated in Table 1. Referring to Table 1, Stock 1 is a control with a non-amine commercial accelerator and Stock 2 is a control with an amine-bearing commercial accelerator. Stocks 3–6 illustrate the invention containing phosphinothioyl amino sulfide accelerators. The cure data indicate that the phosphinothioyl-t-butylamino sulfide accelerator is functionally equivalent to the non-amine commercial accelerator but exhibits about 50 percent greater processing safety (33.5 versus 22.7 minutes). The cure data further indicates that the phosphinothioyl anilino sulfide accelerators exhibit greater processing safety than the amine-bearing commercial accelerator. More significantly, the cord stability data demonstrate that the polyester cords of the polyester fiber composites vulcanized with phosphinothioyl amino sulfide accelerators retain greater strength than the polyester cords in a rubber composite vulcanized with the amine-bearing commercial accelerator.

Polyester fiber-rubber composites comprising blends of natural and synthetic rubbers are illustrated in Tables 2 and 3. The cord stability data confirm that polyester cord in composites vulcanized with phosphinothioyl amino sulfides (Table 2, Stocks 3–7 and Table 3, Stock 3) degrade less thereby retaining greater cord strength than polyester cord vulcanized with amine-bearing commercial accelerators. The improved polyester cord stability in composites vulcanized with phosphinothioyl amino sulfide accelerators is unexpected, especially with phosphinothioyl-t-butylamino sulfide accelerators, since they contain the same amine moiety as in the amine-bearing commercial accelerator.

TABLE I

|  | 1 | 2 | 3 | 4 | 5 | 6 |
|---|---|---|---|---|---|---|
| Masterbatch A | 155.0 | 155.0 | 155.0 | 155.0 | 155.0 | 155.0 |
| Sulfur | 2.5 | 2.5 | 2.5 | 2.5 | 2.5 | 2.5 |
| Thiofide | 0.5 | — | — | — | — | — |
| Santocure NS | — | 0.5 | — | — | — | — |
| Di-n-butoxyphosphinothioyl t-butylamino sulfide | — | — | 0.5 | — | — | — |
| Di-n-butoxyphosphinothioyl anilino sulfide | — | — | — | 0.5 | — | — |
| Di-n-butoxyphosphinothioyl N-isopropylanilino sulfide | — | — | — | — | 0.5 | — |
| Di-n-butoxyphosphinothioyl N-methylanilino sulfide | — | — | — | — | — | 0.5 |
| Mooney Scorch at 121° C | | | | | | |
| $t_5$, min. | 22.7 | 40.2 | 33.5 | 45.5 | 48.4 | 45.6 |
| Rheometer at 153° C | | | | | | |
| R max, Nm | 5.0 | 7.1 | 5.3 | 4.0 | 3.6 | 3.5 |
| $t_{90}$ - $t_2$, min. | 13.1 | 7.8 | 13.7 | 24.4 | 25.8 | 25.7 |
| Stress-Strain at 153° C | | | | | | |
| Cure time, min. | 30 | 20 | 30 | 45 | 45 | 45 |
| 300° modulus, Kg./cm² | 93 | 129 | 96 | 89 | 81 | 75 |
| UTS, Kg./cm² | 198 | 267 | 225 | 189 | 172 | 174 |
| Elongation, % | 500 | 500 | 530 | 510 | 500 | 520 |
| Cord Stability | | | | | | |
| % strength retention | | | | | | |
| Press cure 2 hours at 175° C | 76 | 71 | 78 | 79 | 83 | 81 |

TABLE 2

|  | 1 | 2 | 3 | 4 | 5 | 6 | 7 |
|---|---|---|---|---|---|---|---|
| Masterbatch B | 173.8 | → | → | → | → | → | → |
| Sulfur | 2.0 | → | → | → | → | → | → |
| Thiofide | 1.5 | — | — | — | — | — | — |
| Santocure NS | — | 1.5 | — | — | — | — | — |
| Di-n-butoxy-phosphinothioyl-t-butylamino sulfide | — | — | 1.5 | — | — | — | — |
| Diisopropoxy-phosphinothioyl-t-butylamino sulfide | — | — | — | 1.5 | — | — | — |
| Di-n-butoxy-phosphinothioyl anilino sulfide | — | — | — | — | 1.5 | — | — |
| Diisopropoxy-phosphinothioyl anilino sulfide | — | — | — | — | — | 1.5 | — |
| Diisopropoxy-phosphinothioyl morpholino sulfide | — | — | — | — | — | — | 1.5 |
| Mooney Scorch at 135° C | | | | | | | |
| $t_5$, min. | 10.8 | 20.0 | 11.0 | 11.4 | 19.6 | 22.6 | 16.5 |
| Rheometer at 153° C | | | | | | | |
| R max, Nm | 6.2 | 7.4 | 6.1 | 6.7 | 4.4 | 5.0 | 3.3 |
| $t_{90}$ - $t_2$, min. | 16.8 | 7.8 | 16.1 | 14.2 | 28.3 | 27.0 | 53.8 |
| Cord Stability | | | | | | | |
| % strength retention | | | | | | | |
| Press cure 2 hours at 175° C | 83 | 69 | 83 | 83 | 90 | 87 | 88 |
| Sealed tube at 150° C | | | | | | | |
| 48 hours | 82 | 82 | — | 85 | — | — | 87 |
| 96 hours | 80 | 70 | — | 78 | — | — | 78 |

TABLE 3

|  | 1 | 2 | 3 |
|---|---|---|---|
| Masterbatch C | 179.5 | → | → |
| Sulfur | 2.3 | → | → |
| Thiofide | 1.4 | — | — |
| Santocure NS | — | 1.4 | — |
| Diisopropoxyphosphinothioyl t-butylamino sulfide | — | — | 1.4 |

TABLE 3-continued

| | 1 | 2 | 3 |
|---|---|---|---|
| Mooney Scorch at 135° C | | | |
| $t_5$, min. | 12.9 | 19.3 | 13.9 |
| Rheometer at 153° C | | | |
| R max, Nm | 5.7 | 7.8 | 7.0 |
| $t_{90} - t_2$, min. | 32.4 | 7.3 | 11.5 |
| Stress-Strain at 153° C | | | |
| Cure time, min. | 60 | 30 | 30 |
| 300% modulus, Kg./cm$^2$ | 49 | 88 | 84 |
| UTS, Kg./cm$^2$ | 150 | 165 | 162 |
| Elongation, % | 600 | 480 | 490 |
| Cord Stability | | | |
| % strength retention | | | |
| Sealed tube at 150° C | | | |
| 48 hours | 86 | 89 | 92 |
| 96 hours | 82 | 83 | 87 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. In a process for making a vulcanized composite of diene rubber and terephthalate polyester fiber, wherein the improvement comprises vulcanizing the composite with a vulcanization accelerator of the formula

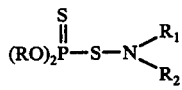

in which R, $R_1$ and $R_2$ independently are alkyl of 1 to 12 carbon atoms, cycloalkyl of 5 to 8 carbon atoms, alkaryl of 7 to 10 carbon atoms, phenyl or mono- or di-lower alkyl substituted phenyl, or $R_1$ is hydrogen or $R_1$ and $R_2$ together with the nitrogen atom form a heterocycle in which $R_1$ and $R_2$ are joined forming an alkylene radical or oxygen interrupted alkylene radical of 4 to 8 carbon atoms.

2. The process of claim 1 in which R is lower alkyl.
3. The process of claim 2 in which $R_1$ is lower alkyl.
4. The process of claim 2 in which $R_1$ is hydrogen.
5. The process of claim 3 in which $R_2$ is lower alkyl.
6. The process of claim 4 in which $R_2$ is lower alkyl.
7. The process of claim 3 in which $R_2$ is phenyl.
8. The process of claim 4 in which $R_2$ is phenyl.
9. The process of claim 7 in which R is isopropyl.
10. The process of claim 8 in which R is isopropyl.
11. The process of claim 4 in which $R_2$ is tert-butyl.
12. The process of claim 11 in which R is isopropyl.
13. The process of claim 1 in which the polyester fiber is poly(ethyleneterephthalate) fiber.
14. A composition comprising diene rubber, terephthalate polyester fiber, sulfur vulcanizing agent and a vulcanization accelerating amount of an accelerator of the formula

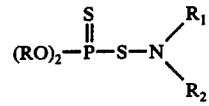

in which R, $R_1$ and $R_2$ independently are alkyl of 1 to 12 carbon atoms, cycloalkyl of 5 to 8 carbon atoms, alkaryl of 7 to 10 carbon atoms, phenyl or mono- or di-lower alkyl substituted phenyl, or $R_1$ is hydrogen or $R_1$ and $R_2$ together with the nitrogen atom form a heterocycle in which $R_1$ and $R_2$ are joined forming an alkylene radical or oxygen interrupted alkylene radical of 4 to 8 carbon atoms.

15. The composition of claim 14 in which R is lower alkyl.
16. The composition of claim 15 in which $R_1$ is lower alkyl.
17. The composition of claim 15 in which $R_1$ is hydrogen.
18. The composition of claim 16 in which $R_2$ is lower alkyl.
19. The composition of claim 17 in which $R_2$ is lower alkyl.
20. The composition of claim 16 in which $R_2$ is phenyl.
21. The composition of claim 17 in which $R_2$ is phenyl.
22. The composition of claim 20 in which R is isopropyl.
23. The composition of claim 21 in which R is isopropyl.
24. The composition of claim 17 in which $R_2$ is tert-butyl.
25. The composition of claim 24 in which R is isopropyl.
26. The composition of claim 14 in which the polyester fiber is poly(ethyleneterephthalate) fiber.

* * * * *